United States Patent [19]
Hyde

[11] 4,106,808
[45] Aug. 15, 1978

[54] TAPPING STRIP RETAINER

[75] Inventor: Michael B. Hyde, Pekin, Ill.

[73] Assignee: Caterpillar Tractor Co., Peoria, Ill.

[21] Appl. No.: 778,201

[22] Filed: Mar. 16, 1977

[51] Int. Cl.$^2$ .............................................. B62D 23/00
[52] U.S. Cl. ................................. 296/35 R; 403/407
[58] Field of Search ............... 296/28 C, 35 R, 35 A; 403/407, 408

[56] References Cited
U.S. PATENT DOCUMENTS 3,990,737  11/1976  Palmer ................................ 296/35 R
4,043,585  8/1977  Yamanaka ........................... 296/35 R

*Primary Examiner*—Philip Goodman
*Attorney, Agent, or Firm*—Wegner, Stellman, McCord, Wiles & Wood

[57] ABSTRACT

A tapping strip retainer is provided which allows for horizontal adjustment of the strip relative to a fixed set of threaded fasteners so as to permit alignment of the threaded fasteners with appropriate tapped openings in said strip. The mounting members for the strip may be located in relatively inaccessible places without preventing effective adjustment of said strip.

10 Claims, 6 Drawing Figures

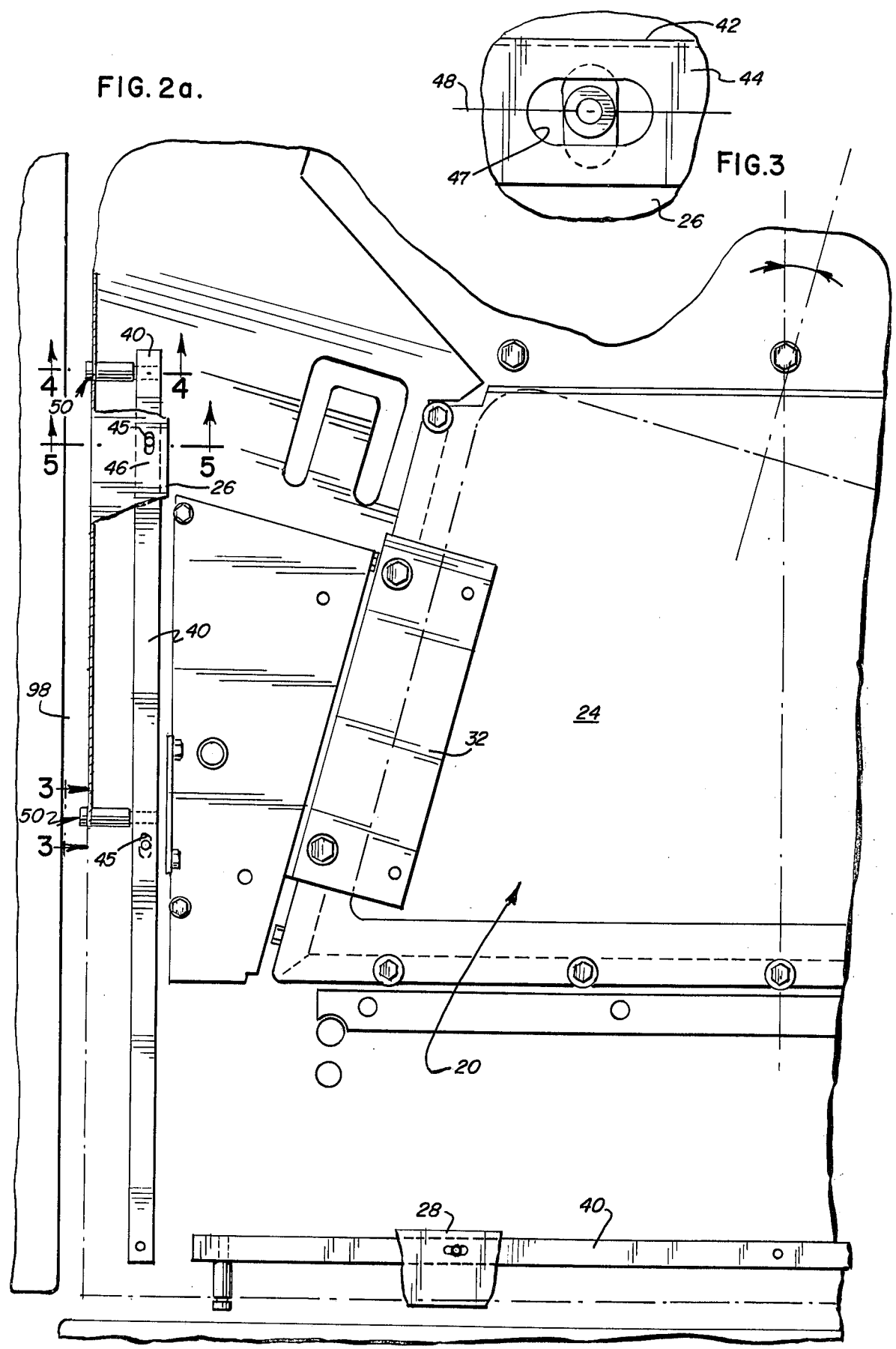

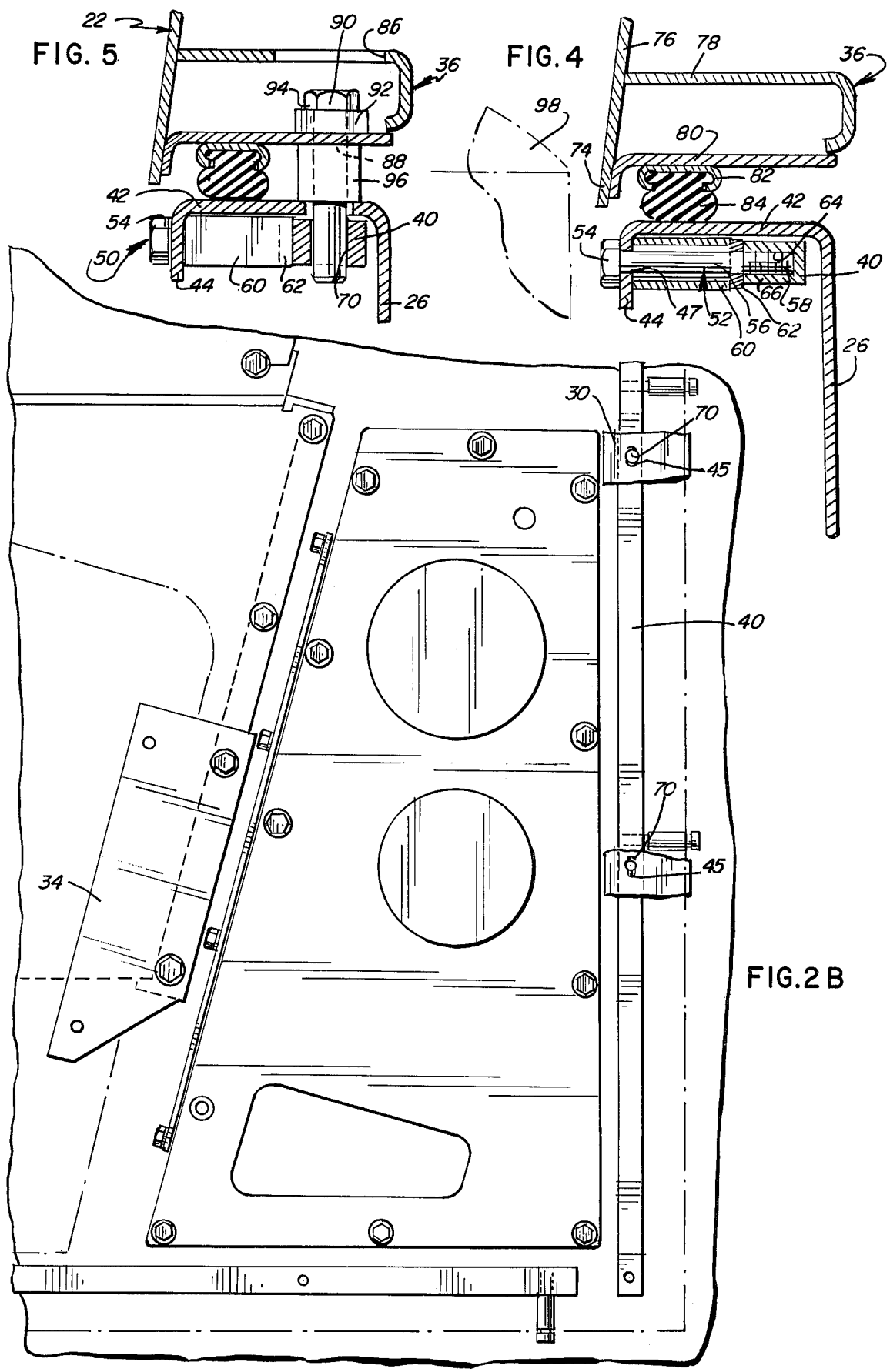

TAPPING STRIP RETAINER

BACKGROUND OF THE INVENTION

1. FIELD of the INVENTION

This invention relates to fastening two parts together and, more particularly, to an adjustable retainer for effecting said fastening.

2. DESCRIPTION of the PRIOR ART

In mounting one part on another by the use of a plurality of aligned fasteners, it requires some degree of precision to locate a plurality of both male and female members and have them all line up when needed. This problem can be especially true when one set of the fasteners, i.e. the female members, are relatively inaccessible due to structural requirements of the equipment. For instance, large earth-moving equipment is often designed for use both with and without an operator cab such that provision must be made for adding a cab when desired. The basic equipment is usually provided with female fastening members around the operator station such that a cab with appropriate male fastening members can be positioned over the operator station whereupon the male fastening members are connected to the female fastening members. Unfortunately, it is not uncommon that only a few of the male and female fastener members will line up such that the cab cannot be firmly and securely mounted in position. The female members are usually permanently affixed in inaccessible locations on the basic equipment making it difficult, if not impossible, to reset them relative to the male members. Likewise, the male members usually project through openings drilled in the mounting plate of the cab. The mounting plates generally are located on the bottom of the cab frame and have overhanging ledges, and the like, which make it almost impossible to redrill the openings for the male member in a new location. The result is a loose cab that may rattle and is otherwise less than securely fastened in position.

SUMMARY OF THE INVENTION

The present invention is directed to overcoming one or more of the problems as set forth above.

According to the present invention, a retainer having one or more male or female fastening members therein is positioned on a base, such as the frame of a tractor, with adjustable mountings for securing said retainer to said base. The mountings can be manipulated so that the retainer can be adjusted relative to said base so as to align said male or female fastening members with the mating fastening members on the component being affixed to said base.

One or more retainers may be provided on said base with each retainer being individually adjustable relative to said base so as to accommodate for different groups of fastener members located on different parts of said component. For instance, on a component, such as an operator cab, a group of fastener members is provided on the bottom of each side wall and the bottom of the back wall thereof. A separate retainer can be provided for each group of fastener members, with each retainer being individually adjustable. The adjustable retainers make it possible to align the fastener members of the component with the fastener members on the base whereupon the component can be positively affixed to said base.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIGS. 2a and 2b, when placed side-by-side, show an enlarged top view of the operator station on the vehicle of FIG. 1 with improved adjustable retainers thereon;

FIG. 3 is a view taken along the line 3—3 of FIG. 2a;

FIG. 4 is a cross-sectional view taken along the line 4—4 of FIG. 2a; and

FIG. 5 is a cross-sectional view taken along the line 5—5 of FIG. 2a.

DESCRIPTION OF THE PREFERRED EMBODIMENT

Figure 1:
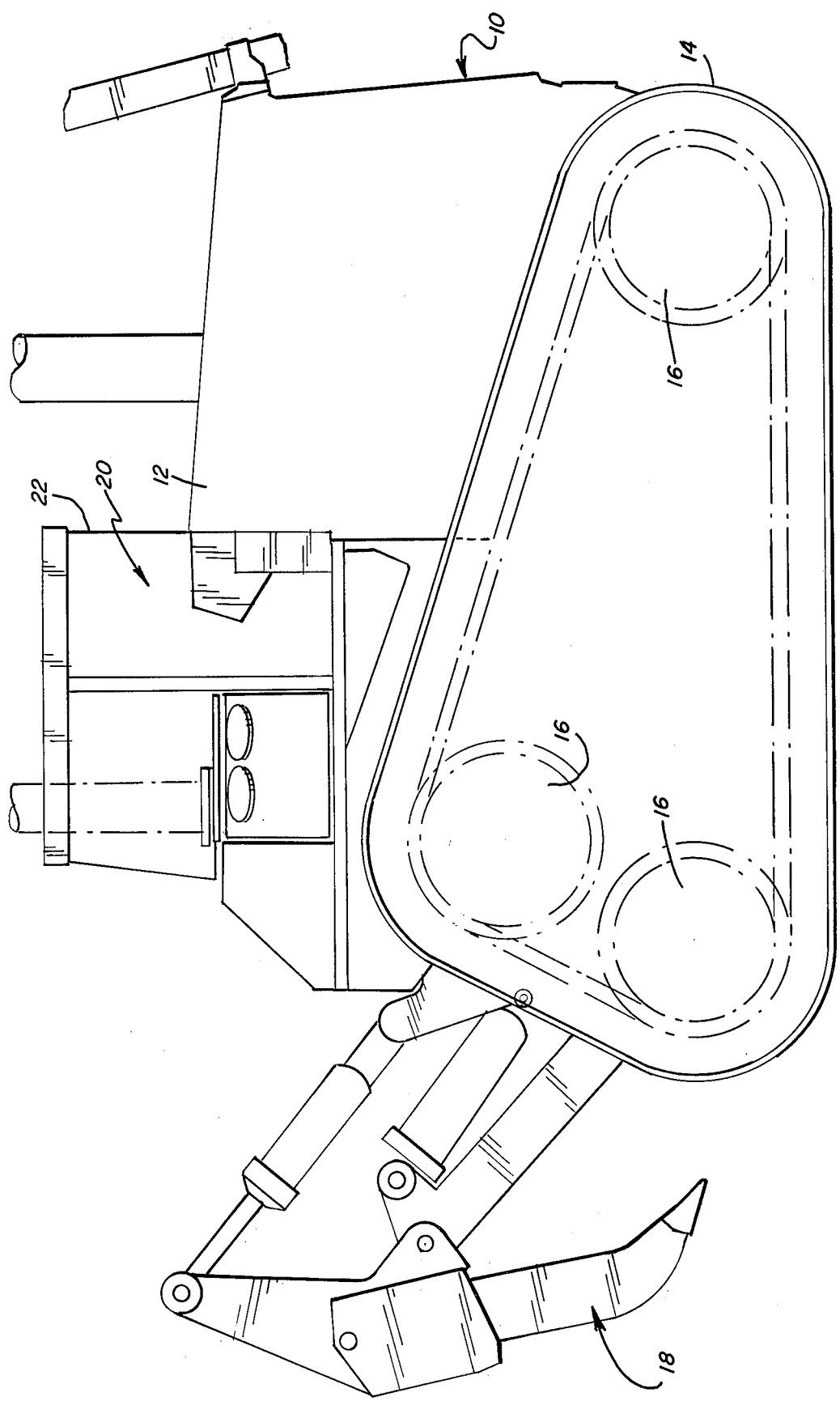
FIG. 1 is an elevational view of a tractor-type vehicle having a removable cab mounted therein.

Referring to the drawings, and in particular FIG. 1, a track-type vehicle, such as a tractor 10, is illustrated and has a frame 12 with a track 14 passing around and being driven by sprockets 16. A ripper mechanism 18 is operatively connected to the rear portion of the vehicle with a scraper blade, or the like, not shown, attached to the front portion thereof. An operator's station or compartment 20 is located on the upper portion of the vehicle 10 and is adapted to be enclosed by a cab 22, shown in phantom outline. The cab 22 can be assembled at the factory or can be added or removed in the field.

The attachment of the cab 22 to the frame 12 of the vehicle 10 is a typical example of the type of fastening arrangement to which the present invention is directed. That is, in manufacturing the basic equipment, such as the tractor 10, the operator's compartment 20 usually has a seat 24 recessed slightly down into the body of the equipment with the control levers, pedals, dials and gauges readily accessible and visible to an operator seated in said seat 24 in the compartment 20. The compartment 20 is generally surrounded, at least partially, by raised walls which can be part of the frame 12 or can be sheet metal parts attached to the frame. When the vehicle 10 is originally assembled at the factory, provision is made for attaching a cab 22 to the frame 12 to encase the operator's compartment 20. The cab 22 can be assembled at the factory or can be added or removed in the field. Heretofore, the frame 12 or sheet metal surrounding the operator's compartment 20 was drilled and provided with either threads or female threaded members spot welded or otherwise secured to said frame or sheet metal. The cab 22, with downwardly depending threaded male members, was brought in registry with the operator's compartment 20 where, theoretically, at least the threaded male members would align with and be threadable into the threaded female members. In practice, it was almost impossible to maintain the tolerances of all of the threaded female members and the positioning of all of the threaded male members so that when the cab 22 was placed in position, the male members would align with and mate into the female members. This misalignment was caused by many variable factors, such as use of the vehicle inherently distorts and deflects the various portions of the frame and body of the vehicle so that the various parts thereof assume different orientations with respect to other parts. In addition, the cab 22 was subject to certain distortions, and the like, in shipment and handling prior to assembling and, lastly, accumulated tolerances from one opening to the next, or from one threaded male member to the next, could add up to a point where two or three openings may register, but the remaining openings become progressively more misaligned and unusable. This same problem exists with respect to assembling two different parts together that are separately manufactured where one of the parts is subject to distortion, and the like, through handling and use.

For the purposes of illustration, the present invention is described as being used to assemble a cab 22 on the frame 12 of a track-type vehicle 10, it will be seen in FIGS. 2a and 2b that the operator's compartment 20 is provided with the seat 24 positioned down between upright wall portions 26, 28, 30 and have arm rests 32, 34 thereon. The operator's compartment 20 has various controls located to the left of the compartment, in front of the compartment and to the right of the compartment. When it is desired to assemble a cab 22 with the vehicle frame 12, the cab 22 should take in not only the seat area 24 of the operator's compartment 20, but also the surrounding deck area which contains the various instruments and controls used by the operator. In the present illustration, the cab 22 is intended to be fastened to the vehicle frame 12 along the flat areas defined by the upwardly facing surfaces of the side walls 26, 30 and the back wall 28. The cab 22 is lowered over the operator's compartment 20 with the bottom flange 36 of the cab 22 (FIGS. 4, 5) resting on said upwardly facing surfaces of the walls 26, 28, 30 surrounding said compartment 20.

In attaching the cab 22, three retainer bars or plates 40 have been found to be most practical. Two of the bars 40 are spaced apart and lie substantially parallel to each other along the opposite side walls 26, 30 of the compartment 20 and the third bar or plate 40 extends between said side walls 26, 30 along the back wall 28. For the purposes of this disclosure, only the left-hand retainer bar 40 will be described, said retainer being shown in FIG. 2a, with the details of the construction, attachment and operation thereof being shown in FIGS. 3, 4 and 5. It is to be understood that the same description applies to all three retainer bars 40.

As shown in FIGS. 4 and 5, the side wall 26 is formed of sheet metal attached to the frame 12 of the vehicle 10 and has a transversely disposed top surface 42 bridging between the spaced apart, vertically extending wall 26 and the depending flange 44. A plurality of elongate openings 45 are formed through the top surface 42 of the wall 26, which openings align with the top surface of the retainer bar 40. The long axis 46 of the openings 45 lie parallel to the side wall 26. Spaced apart, elongate openings 47 are formed in the flange 44, as best shown in FIG. 3, with the long axis 48 of the opening 47 lying parallel to the top surface 42 of the wall 26. Adjustable mounting members 50 pass through the elongate openings 47 and releasably engage with the retainer bar 40. Specifically, each mounting member 50 comprises a bolt 52 having a head 54 and an elongate body portion 56 threaded at one end 58. The bolt 52 passes through the opening 47 and through an elongate sleeve 60, washer 62 and is threaded into tapped opening 64 formed in the side wall 66 of the elongate retainer bar or plate 40. The head 54 of the bolt 52 overlaps the upper and lower outer edges of the opening 47 with the elongate sleeve 60 overlapping the upper and lower inner edges of said opening 47 so that tightening the bolt 52 into retainer bar 40 will press the retainer bar 40 against the sleeve 60 and flange 44 to lock the retainer bar relative to the flange.

As shown, there are two mounting members 50 used for positioning the retainer bar 40, although it should be understood that one or more mounting members could be used. When the bolts 52 of the mounting members 50 are drawn up tight, they will lock the retainer bar 40 in position relative to the side wall 26. The top surface of the retainer bar 40 has a plurality of tapped openings 70 formed transversely to the plane of said top surface with one opening 70 generally aligned with the elongate openings 45 formed in the top surface 42 of the wall 26. When it is desired to shift the retainer bar 40 parallel to the side wall 26 of the frame 12, it is only necessary to release the tension on the mounting members 50 whereupon the retaining bar 40 can be shifted axially an amount up to the length of the elongate openings 47 in the flange 44 of the side wall 26. The retainer bar 40 is shifted relative to the side wall 26 so as to position the tapped openings 70 in different selected positions relative to the elongate openings 45 in the top surface 42 of said wall 26. The length of the elongate openings 45 is equal to or greater than the length of the elongate openings 47 in the flange 44 of the side wall 26. The tapped openings 70 in the top surface of the retainer bar 40 are axially spaced from the tapped openings 64 in the side wall 66 of said retainer.

As viewed in FIGS. 4 and 5, the bottom outer edge 74 of the cab 22 is provided with the tubular-shaped mounting ledge or flange 36 which is welded or otherwise secured to the wall 76 of the cab. The U-shaped ledge or flange 36 can be formed as one piece or can be two or more pieces welded together to provide spaced apart planar portions 78, 80. A channel-shaped holder 82 is welded or otherwise secured to the bottom surface of the planar portion 80 of the flange 36 with an elongate resilient sealing member 84 held in said channel and depending downwardly therefrom. When the cab 22 is aligned with and resting on the top surfaces 42 of the walls 26, 28, 30 of the frame 12 surrounding the operator's compartment 20, the resilience of the resilient sealing member 84 forms a seal, as well as a sound deadening bumper between the frame 12 of the vehicle 10 and the cab 22. The upper planar portion 78 of the flange 36 has a plurality of relatively large, spaced apart openings 86 formed therein. Smaller openings 88 are somewhat centrally aligned with the openings 86 and are formed through the lower planar portion 80 of the flange 36. A bolt or male member 90 passes freely through opening 86 and is inserted through the opening 88 with a washer 92 surrounding the male member 90. Access to the hexagonal head 94 of the male member 90 is gained through opening 86. A solid spacer member 96 has a predetermined height and surrounds the male member 90 below the portion 80 of the flange 36. In practice, a plurality of such male members 90 are projected downwardly through the lower portion 80 of the flange 36 around the outer periphery of three sides 26, 28, 30 of the cab 22. Theoretically, the spacing between the centerlines of adjacent male members 90 is maintained according to a predetermined tolerance range.

When the cab 22 is to be assembled with the vehicle 10, the cab is lowered down on to the top surface 42 of the walls 26, 28, 30 surrounding the operator'compartment 20 so that the resilient sealing member 84 is compressed between the cab 22 and the frame 12 of the vehicle 10. The mounting members 50 for the retainer bars 40 are loosened so that the retainer bars 40 may be shifted longitudinally relative to the frame 12. The threaded portion of the male members 90 are inserted through the elongate slots or openings 45 in the top surface 42 and the retaining bar 40 on wall 26 is shifted until the threaded male members 90 align with the tapped openings 70 in the retainer bar 40. The threaded male members 90 are then turned down partially into the tapped openings 70 in the retainer bars 40. The same procedure is followed on the back wall 28 and on the side wall 30 until all of the threaded male members 90 are loosely threaded into the tapped openings 70 in the retainer bars 40. The mounting members 50 are then drawn up tight by turning the threaded mounting bolts 52 until the retainer bars 40 are locked in position relative to the walls 26, 28, 30. The threaded male members 90 are then likewise cranked up tight so as to compress the sealing bumper members 84 between the walls 26, 28, 30 of the vehicle 10 and the cab 22. When all of the threaded male members 90 are tight, the cab 22 is firmly affixed to the frame 12 of the vehicle 10.

In practice, once the vehicle has been assembled, there are fuel, water and hydraulic tanks 98 positioned on either side and to the rear of the walls 26, 28, 30 defining the operator's compartment 20. As shown in FIG. 4, the tank 98 is mounted close to the flange 44 of the wall 26 of the frame 12, such that there is only limited access to the mounting members 50 which position the retaining bar 40 relative to the frame 12. The spacing between the tank 98 and the flange 44 allows only for the entrance of the head of an open-ended wrench, or similar type wrench, for manipulating said mounting member. There is no access to the area beneath the top surface 42 or behind the flange 44 of the wall 26. Accordingly, the only way the tapped retainer bar 40 can be adjusted is through the loosening of the mounting members 50 and the axial shifting of said bar 40 by manipulating said mounting members. In other words, the present invention provides for adjusting the tapped retainer bar 40 so as to properly align the tapped openings 70 in said retainer bar 40 into registry with appropriate male members 90 carried by the cab 22, even though limited access is afforded for making said adjustment.

From the above, it can be seen that anytime it is necessary to secure one member to another by the use of male and female members, it is possible to affix an adjustable tapped retainer bar 40 relative to a limited access area so that male members 90 carried by the other part can be aligned and secured to the tapped retainer bar 40 without complication.

The embodiments of the invention in which an exclusive property or privilege is claimed are defined as follows:

1. In a retainer for fastening two parts together comprising an elongate bar, one of said parts having a wall with at least one elongate opening therethrough, mounting means passing through one of said elongate openings and engaging with said elongate bar, fastening means on said bar, mating fastening means on said other of said parts and aligning with said elongate bar, said mounting means being released to adjust the position of said fastening means on said bar into alignment with the fastening means on said other part whereby said fastening means are fastened together and said mounting means is locked to said one part.

2. In a retainer as claimed in claim 1 wherein said mounting means comprises a bolt passing through said elongate opening and threadingly engaging said elongate bar, a sleeve surrounding said bolt and extending between said elongate bar and said wall whereby tightening said bolt locks the bar against the sleeve and wall to hold said bar fixed relative to said wall.

3. In a retainer as claimed in claim 1 wherein said fastening means on said bar is a tapped opening and said fastening means on said other of said parts is a threaded bolt, said threaded bolt being threaded into said tapped opening when said bar is aligned therewith.

4. In a retainer as claimed in claim 1 wherein said fastening means on said bar is at least two tapped openings and said fastening means on said other of said parts is at least two threaded bolts spaced apart the same distance as said tapped openings.

5. In a retainer as claimed in claim 4 wherein said mounting means is at least two bolts passing through at least two elongate openings in said wall and threadingly engaging said elongate bar, said mounting means including sleeves surrounding said bolts and extending between said bar and said wall whereby tightening said bolts grips the bar against said sleeves and said wall to lock said bar relative to said wall.

6. In a retainer as claimed in claim 5 wherein said bolts and said bar can be shifted throughout the length of said elongate openings when said bolts are loosened with respect to said bar.

7. An adjustable mounting for a retainer having at least one fastener means oriented transverse to the axis thereof, a wall having an elongate opening therein, at least one mounting member passing through said elongate opening and engaging with said retainer, said elongate opening having its long axis lying parallel to the axis of said retainer, said retainer being adjustable relative to said wall by moving said mounting member relative to said elongate opening in said wall of the frame whereby said fastener means on said retainer is moved relative to said wall.

8. An adjustable mounting as claimed in claim 7 wherein said fastener means is a tapped opening in said retainer, the axis of said opening lying substantially parallel to said wall.

9. In a cab mounting for a vehicle having at least two spaced apart walls, a tapped retainer bar associated with each wall, each of said walls having at least two elongate openings therethrough, mounting means passing through each of said elongate openings and engaging with the elongate bar associated with said wall, fastening means on each of said bars, mating fastening means on said cab aligning with said elongate bars, the mounting means on each wall being released to adjust the position of said fastening means on said bar in alignment with the fastening means on said cab whereby said aligned fastening means are fastened together and said mounting means are locked to secure said cab on said vehicle.

10. In a cab mounting as claimed in claim 9 wherein each said mounting means comprises a bolt passing through one of said elongate openings and threadingly engaging said associated elongate bar, a sleeve surrounding said bolt and extending between said elongate bar and said wall whereby tightening said bolt locks the bar against the sleeve and wall to hold said bar fixed relative to said wall.

* * * * *